Jan. 4, 1927.

J. MARKONICH 1,613,043

AUTOMOBILE BUMPER

Filed Sept. 27, 1926

INVENTOR.
JOE MARKONICH
BY Carl Miller
ATTORNEY.

Patented Jan. 4, 1927.

1,613,043

UNITED STATES PATENT OFFICE.

JOE MARKONICH, OF LOS ANGELES, CALIFORNIA.

AUTOMOBILE BUMPER.

Application filed September 27, 1926. Serial No. 137,903.

This invention relates to vehicle bumpers and more particularly to a bumper for attachment to automobiles.

An important object of the invention is to provide a device of this character which has the necessary strength and which, at the same time, has not too great a weight and may be inexpensively produced.

A further object of the invention is to provide a device of the character which may be readily attached and which has employed in its construction a minimum number of parts all formed of the same material.

A still further object of my invention is to provide a vehicle bumper bar that is made of one piece, that may be stamped or pressed from a bar of cold rolled steel, and that will have a groove extending for the full length, and yet will provide a bumper surface of proper width.

A further object is to provide a bumper bar having a smooth bumper surface with no attaching means projecting beyond the smooth bumper surface.

A still further object of my invention is to provide a bumper bar constructed of a single integral unitary structure.

These and other objects I attain by the construction shown in the accompanying drawings, in which the same reference characters indicate the same parts in all of the views.

Figure 1:
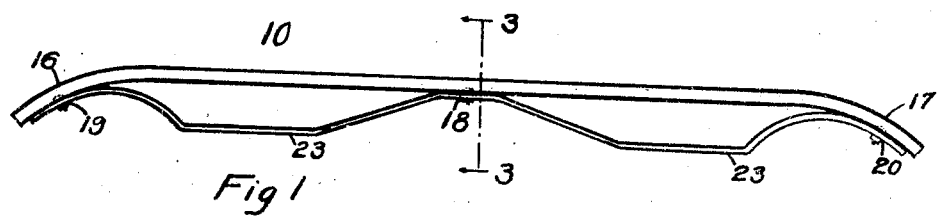
Figure 1 is a top view of the bumper.
Figure 2:
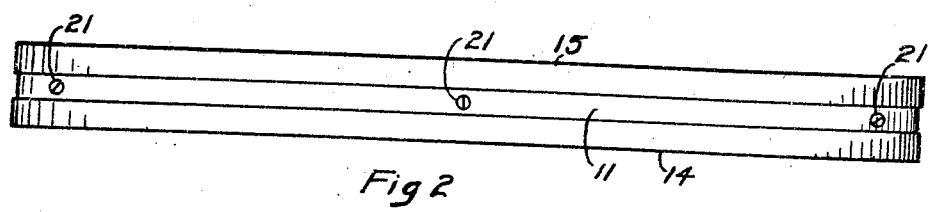
Figure 2 is a view in front elevation of the bumper.
Figures 3, 4:
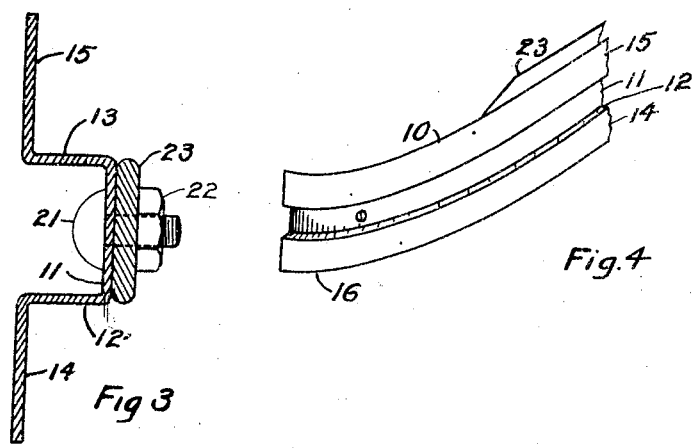
Figure 3 is a view taken on the line 3—3 of Figure 1 looking in the direction of the arrows, and showing particularly the channel section and the integral wings formed therewith.
Figure 4 is a fragmentary perspective view of the bumper.

Referring now more particularly to the drawings, the front or bumper bar 10 consists of a central portion or base 11 having side flanges 12 and 13 extending at right angles forwardly therefrom, thereby forming a channel section. Wings 14 and 15 respectively extend at right angles forwardly from the flanges and in parallelism to the central portion 11. The bar 10 curves slightly to the rear, as shown at 16 and 17 respectively, and the central portion 11 has a hole 18 at the middle thereof and holes 19 and 20 at about the middle of the curved end sections, and through these holes bolts 21 are passed and fastened, by means of nuts 22, to a supporting means, the supporting means in this instance comprising a semi-elliptical spring 23 which is attached to the vehicle by any convenient conventional means, well-known in the art. It will be noted that the bolts have their heads hidden in and protected by the channel formed by the flanges and the wings, which wings thereby present a smooth protecting bumper surface of substantial strength and width, and further that the central portion, flanges and wings are all of substantially the same thickness. As is obvious from the drawing, the channel section or groove extends the entire length of the bumper, and the bumper may be constructed of any suitable material, although the preferred material will be cold rolled steel, and may be made from a single bar of appropriate width and thickness.

It will be obvious that the general structure hereinbefore set forth must necessarily be modified in certain particulars to permit its attachment to various types of cars and I accordingly do not limit myself to such specific structure except as hereinafter claimed.

Having thus described my invention, what I claim is:—

1. An integrally formed automobile bumper bar, comprising a flat elongated projecting wing on the lower portion thereof, a channeled section centrally located and extending in the same horizontal direction as said wing, a second wing extending on the upper portion of said channeled section and in the same plane as said first wing, as and for the purpose set forth.

2. An integrally formed automobile bumper bar, comprising a flat elongated projecting wing on the lower portion thereof, a channeled section centrally located and extending in the same horizontal direction as said wing, a second wing extending on the upper portion of said channeled section and in the same plane as said first wing, resilient means bolted to said channeled section for holding said bumper in its fixed position, as and for the purpose set forth.

3. A vehicle bumper bar consisting of an integral bar, said bar comprising a central portion, an upper and a lower flange extending at substantially right angles forwardly therefrom, each flange having a wing extending at right angles therefrom and in parallelism with the central portion, said central portion, flanges and wings all being of the same thickness.

4. An integral vehicle bumper bar consisting of a channel section and wings, said channel section extending the full length of the bumper, the greater part of the bumper bar being substantially straight and the end sections being slightly curved toward the rear, the channel section consisting of a central portion and flanges extending at right angles forwardly therefrom, and the wings extending at right angles from the flanges and parallel to the central portion.

5. An integral vehicle bumper bar consisting of a channel section and wings, said channel section extending the full length of the bumper, the greater part of the bumper bar being substantially straight and the end sections being slightly curved toward the rear, the channel section consisting of a central portion and flanges extending at right angles forwardly therefrom, and the wings extending at right angles from the flanges and parallel to the central portion, said central portion, flanges and wings being of substantially the same thickness.

6. An integral vehicle bumper bar consisting of a channel section and wings, said channel section extending the full length of the bumper, the greater part of the bumper bar being substantially straight and the end sections being slightly curved toward the rear, the channel section consisting of a central portion and flanges extending at right angles forwardly therefrom, and the wings extending at right angles from the flanges and parallel to the central portion, there being a bolt-hole at the middle of said central portion and one in the middle of each of the curved ends of said portion.

7. An integral vehicle bumper bar consisting of a channel section and wings, said channel section extending the full length of the bumper, the greater part of the bumper being substantially straight and the end sections being slightly curved toward the rear, the channel section consisting of a central portion and flanges extending at right angles forwardly therefrom, and the wings extending at right angles from the flanges and parallel to the central portion, supporting means for said bumper, fastening means for attaching the bumper to said supporting means, whereby the fastening means is protected by the channel section.

8. An integral vehicle bumper bar consisting of a channel section and wings, said channel section extending the full length of the bumper, the greater part of the bumper being substantially straight and the end sections being slightly curved toward the rear, the channel section consisting of a central portion and flanges extending at right angles forwardly therefrom, and the wings extending at right angles from the flanges and parallel to the central portion, said central portion, flanges and wings being of substantially the same thickness, supporting means for said bumper, fastening means for attaching the bumper to said supporting means, whereby the fastening means is protected by the channel section.

In testimony whereof I hereby affix my signature.

JOE MARKONICH.